United States Patent [19]

Asada et al.

[11] 4,426,511
[45] Jan. 17, 1984

[54] HEAT-RESISTING AROMATIC POLYESTER RESIN AND PROCESS FOR PREPARING THE SAME

[75] Inventors: Masahiro Asada, Kobe; Miyuki Matsuura, Nishinomiya; Kazuya Yonezawa, Kobe, all of Japan

[73] Assignee: Kanegafuchi Kagaku Kogyo Kabushiki Kaisha, Osaka, Japan

[21] Appl. No.: 313,670

[22] Filed: Oct. 21, 1981

[30] Foreign Application Priority Data

Oct. 24, 1980 [JP] Japan .................. 55-150004

[51] Int. Cl.³ .............................................. C08G 63/18
[52] U.S. Cl. ..................... 528/128; 528/125; 528/126; 528/173; 528/179; 528/182; 528/191; 528/193; 528/194
[58] Field of Search ............... 528/191, 193, 194, 125, 528/126, 128, 173, 179, 182

[56] References Cited

U.S. PATENT DOCUMENTS

| | | | |
|---|---|---|---|
| 3,133,898 | 5/1964 | Keck | 528/193 |
| 3,374,202 | 3/1968 | Christain | 528/193 |
| 3,704,279 | 11/1972 | Ismail | 528/193 |
| 3,766,140 | 10/1973 | Ismail | 528/194 |
| 3,884,990 | 5/1975 | Sakata et al. | 528/193 |
| 3,939,117 | 2/1976 | Ueno | 528/191 |
| 4,127,557 | 11/1978 | Deex et al. | 528/193 |
| 4,229,565 | 10/1980 | Gardner et al. | 528/194 |
| 4,275,188 | 6/1981 | Berger et al. | 528/193 |
| 4,289,870 | 9/1981 | Donohue et al. | 528/193 |

Primary Examiner—Lester L. Lee
Attorney, Agent, or Firm—Armstrong, Nikaido, Marmelstein & Kubovcik

[57] ABSTRACT

A heat resisting aromatic polyester resin comprising (a) recurring units of the formula (I):

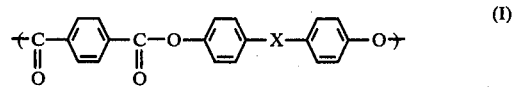

wherein X is a bivalent group selected from the group consisting of an unsubstituted or substituted bivalent hydrocarbon group having 1 to 10 carbon atoms, —O—, —S—, —SO$_2$—and—CO—, and (b) recurring units of the formula (II):

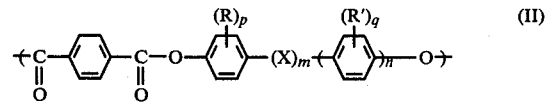

wherein X is as defined above, R and R' are a group selected from the group consisting of alkyl, aryl, aralkyl, alkoxyl, aryloxyl and phenylalkoxyl groups having 1 to 20 carbon atoms, their substituted groups, a halogen atom and a mixture thereof, p+q=1 to 8, and m and n are 0 or 1, but n is not 0 when m is 1, provided that up to 10% by mole of the total of the units:

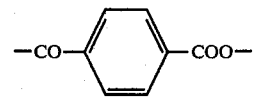

in the formulas (I) and (II) may be replaced with units:

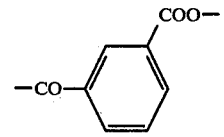

the ratio of (a)/[(a)+(b)]being from 0.05 to 0.95 by mole. The polyester resin is substantially amorphous and soluble in some organic solvents, and has an excellent heat resistance. The polyester resin is prepared by reacting terephthaloyl chloride with alkali metal salts of at least two kinds of particular bivalent phenolic compounds in the presence of a phase transfer catalyst.

12 Claims, 3 Drawing Figures

HEAT-RESISTING AROMATIC POLYESTER RESIN AND PROCESS FOR PREPARING THE SAME

BACKGROUND OF THE INVENTION

The present invention relates to a linear aromatic polyester copolymer having a heat resistance and a process for the preparation thereof.

Aromatic polyester resins consisting of aromatic dicarboxylic acids and bivalent phenolic compounds have been known from old times. Various processes for preparing the aromatic polyester resins are also known, e.g. a process by an interfacial polymerization in which an aromatic dicarboxylic acid chloride dissolved in an organic solvent immiscible with water and a bisphenol compound dissolved in an aqueous alkali solution are mixed and reacted (as disclosed in Japanese Patent Publication No. 1959/1965), a process by solution polymerization in which an aromatic dicarboxylic acid chloride and a bisphenol compound are reacted in an organic solvent (as disclosed in Japanese Patent Publication No. 5599/1962), and a process by ester interchange in which an aromatic dicarboxylic acid phenyl ester and a bisphenol compound are heated (as disclosed in Japanese Patent Publication Nos. 15247/1963 and 28119/1968). In the polymers so prepared, for instance, a polymer of 2,2-bis(4-hydroxyphenyl)propane as a bisphenol component and terephthalic acid as an aromatic dicarboxylic acid component is a crystalline polymer and is slightly soluble in an organic solvent, and accordingly the use has been attended with difficulty, despite of having an excellent heat resistance, i.e. melting point of 350° C. In order to eliminate this defect, it is proposed to impart flexural portions into the polymer molecule by employing isophthalic acid as one of dicarboxylic acid components so as to produce a substantially amorphous polymer. This modification is useful in its own way, but has the disadvantages that isophthalic acid must be employed in as small amount as possible when an excellent heat resistance is desired, and the degree of crystallinity increases with the decrease of the amount.

SUMMARY OF THE INVENTION

It has now been found that an aromatic polyester resin which is substantially amorphous and soluble in an organic solvent and moreover has an excellent heat resistance can be prepared by polymerizing terephthalic acid as a dicarboxylic acid component and at least two kinds of particular bivalent phenolic compounds.

In accordance with the present invention, there is provided an aromatic polyester resin comprising (a) recurring units of the following formula (I):

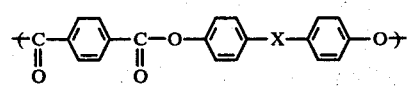
(I)

wherein X is a bivalent group selected from the group consisting of an unsubstituted or substituted bivalent hydrocarbon group having 1 to 10 carbon atoms, —O—, —S—, —SO$_2$— and —CO—,
and (b) recurring units of the following formula (II):

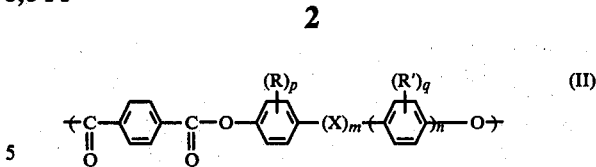
(II)

wherein X is as defined above, R and R' are a group selected from the group consisting of alkyl, aryl, aralkyl, alkoxyl, aryloxyl and phenylalkoxyl groups having 1 to 20 carbon atoms, their substituted groups, a halogen atom and a mixture thereof, p+q=1 to 8, and m and n are 0 or 1, but n is not 0 when m is 1, provided that up to 10% by mole of the total of the units:

in the formulas (I) and (II) may be replaced with units:

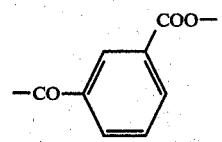

the ratio of (a)/[(a)+(b)] being from 0.05 to 0.95 by mole.

DETAILED DESCRIPTION

Figure 1:
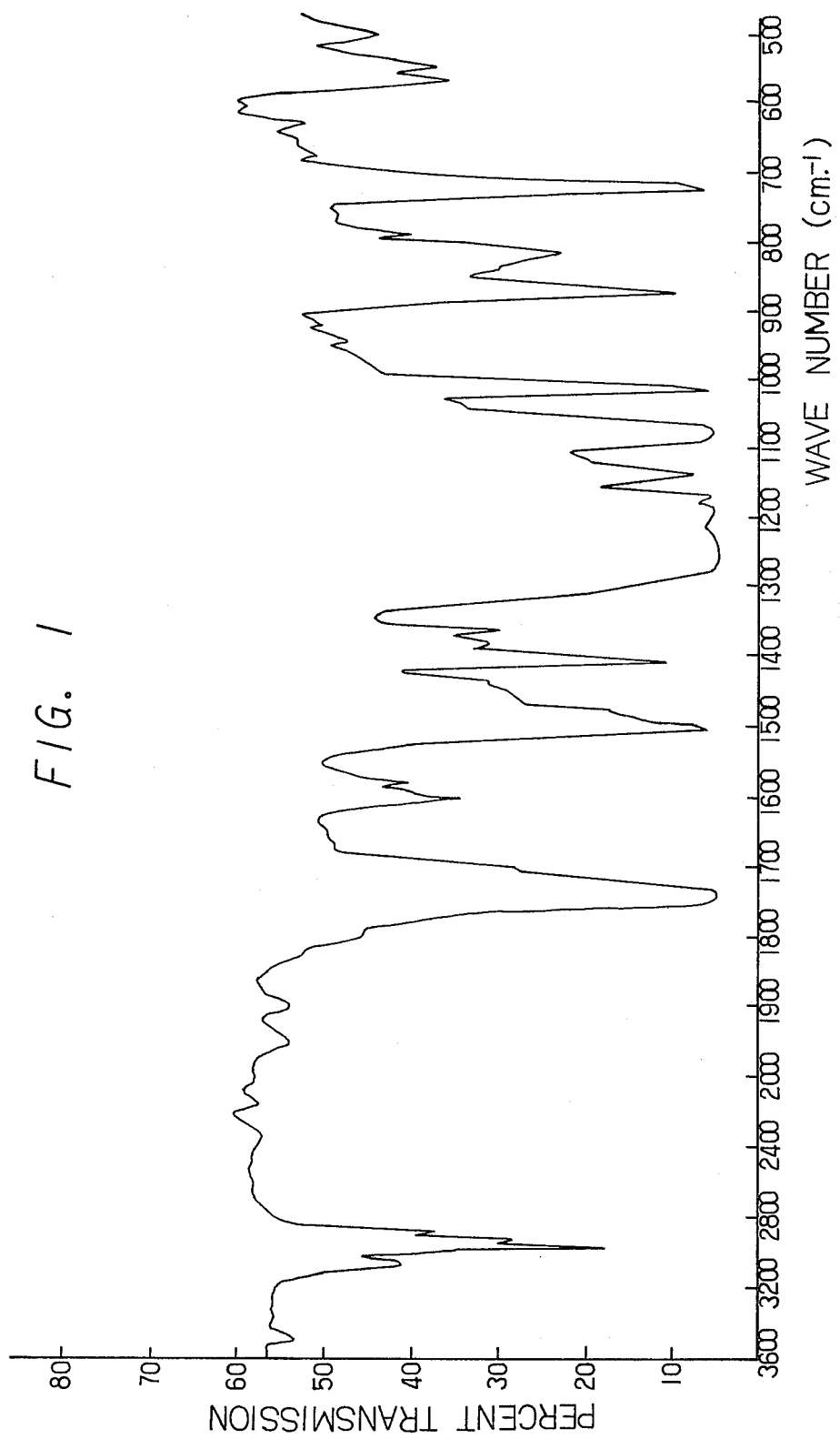
FIG. 1 is an infrared absorption spectrum of the polyester resin of the present invention formed into a film.

The polyester resin of the present invention is soluble in organic solvents, for instance, even in low boiling solvents such as halogenated hydrocarbons and has a high softening point, and is a substantially amorphous, linear polymer. The molar ratio of the component (a) to the total of the components (a) and (b) is from 0.05 to 0.95, preferably 0.15 to 0.85. When the molar ratio does not fall within the above range, the degree of crystallinity is too high or the heat resistance is insufficient. Moreover, as shown in Examples described after, the polyester resin of the present invention has excellent hot water resistance and hot alkali rresistance as compared with commercially available aromatic polyester resins. Hitherto, it is known that an aromatic polyester resins consisting of terephthalic acid, isophthalic acid and 2,2-bis(4-hydroxyphenyl)propane has an excellent heat resistance and provides tough moldings. However, the known polyester resin has the defect of being poor in hot water and hot alkali resistances, and when films and moldings made thereof are immersed in a hot water or a hot aqueous alkali solution, they cause crazing phenomenon or lowering of physical properties.

The substituent groups R and R' in the recurring units (II) are an alkyl, aryl, aralkyl, alkoxyl, aryloxyl or phenylalkoxyl group having 1 to 20 carbon atoms, a substituted group thereof, a halogen atom, or a mixture thereof. Especially, the groups R and R' are selected from the group consisting of alkyl, aryl, aralkyl, alkoxyl, aryloxyl and phenylalkoxyl group having 1 to 20 carbon atoms, their substituted groups and a mixture thereof. Preferable recurring units (II) are those having the following formula:

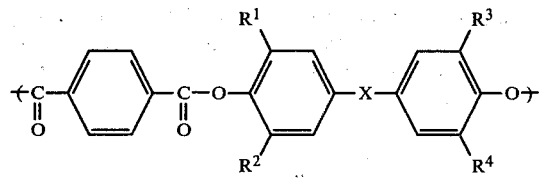

wherein X is as defined above, and $R^1$, $R^2$, $R^3$ and $R^4$ are an alkyl group having 1 to 4 carbon atoms, an alkoxyl group having 1 to 4 carbon atoms or a halogen atom.

Also, the polyester resins of the present invention in which 99 to 1% by mole, especially 50 to 99% by mole, of the units (II) are those having the group R other than a halogen atom and 1 to 99% by mole, especially 50 to 1% by mole, of the units (II) are those having the group R being a halogen atom, have an improved flame resistance. It is preferred that all of them are methyl group, since bisphenol compounds having such substituent groups are easily obtainable.

The polymers in which the recurring units (I) and (II) are regularly arranged are also included in the scope of the present invention. Formation of such polymers has a connection with a process for the preparation mentioned after. Such polymers have an improved thermal property as compared with the polymers in which the recurring units (I) and (II) are randomly arranged.

The polymers of the present invention are soluble in halogenated hyrocarbons such as methylene chloride, chloroform, 1,1,2-trichloroethane, 1,1,2,2-tetrachloroethane, chlorobenzene, o-dichlorobenzene, and the like. In general, the polymers have a melting point of not less than 270° C. Therefore, they are usable as heat resisting films or moldings. Also, in general, the polymers of the present invention have an intrinsic viscosity of 0.1 to 5.0 (at 32° C. in chloroform). The polymers having an intrinsic viscosity of 0.3 to 2.0 are particularly suitable for use in the preparation of moldings.

The polymers of the present invention are prepared in a particular manner. Although various processes for preparing aromatic polyester resins from aromatic dicarboxylic acid chlorides and bisphenol compounds are known as stated before, the process of the present invention is distinguished from known processes in that a phase transfer catalyst is utilized. Unlike a usual cationic emulsifier, catalyst itself transfers between different two phases while exchanging an anion so as to promote the reaction, as described in a publication, "Phase Transfer Catalysis in Organic Synthesis" [W. P. Weber and G. W. Gokel, published by Springer-Verlag KG (1977)]. Therefore, the reaction proceeds in an organic phase, but not at the interface. A replacement reaction by a phase transfer catalyst is more easy to proceed, the higher the concentration of an anion to be reacted in an organic phase.

The acid halide used in the present invention is terephthaloyl chloride. Up to 10% by mole of terephthaloyl chloride may be replaced with isophthaloyl chloride.

As bisphenol compounds to be reacted with terephthaloyl chloride, there are employed (A) at least one compound of the following general formula (III):

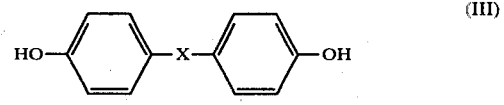

wherein X is a bivalent group selected from the group consisting of an unsubstituted or substituted bivalent hydrocarbon group having 1 to 10 carbon atoms, e.g. an alkylene or halogenated alkylene group having 1 to 10 carbon atoms, a cycloalkylidene group having 5 to 8 carbon atoms or an arylene group having 6 to 10 carbon atoms, —O—, —S—, —SO₂— and —CO—, and (B) at least one compound of the following general formula (IV):

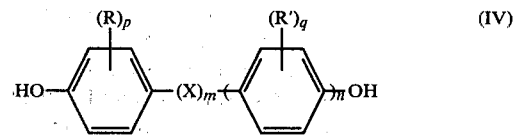

wherein X is as defined above, R and R' are a group selected from the group consisting of alkyl, aryl, aralkyl, alkoxyl, aryloxyl and phenylalkoxyl groups having 1 to 20 carbon atoms, their substituted groups, a halogen atom and a mixture thereof, p+q=1 to 8, and m and n are 0 or 1, but n is not 0 when m is 1.

Among the compounds (IV), there are particularly preferred as a bisphenol component (B) those having the following general formula:

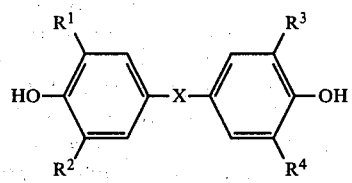

wherein X, $R^1$, $R^2$, $R^3$ and $R^4$ are as defined above, because of being easily obtainable and providing a polymer having improved hot water and hot alkali resistances.

Examples of the preferable compounds (IV) are 2,2-bis(3,5-dimethyl-4-hydroxyphenyl)propane, 2,2-bis-(3,5-di-sec-butyl-4-hydroxyphenyl)propane, 2,2-bis(3,5-di-tert-butyl-4-hydroxyphenyl)propane, bis(3,5-dimethyl-4-hydroxyphenyl)methane, 1,1-bis(3,5-dimethyl-4-hydroxyphenyl)ethane, 1,1-bis(3,5-dimethyl-4-hydroxyphenyl)cyclohexane, 2,2-bis(3,5-dichloro-4-hydroxyphenyl)propane, 2,2-bis(3,5-dibromo-4-hydroxyphenyl)propane, 2,2-bis(3-bromo-4-hydroxy-5-methylphenyl)propane, bis(3,5-dimethyl-4-hydroxyphenyl)sulfone, bis(3,5-dimethyl-4-hydroxyphenyl)ketone, bis(3,5-dimethyl-4-hydroxyphenyl)ether, bis(3,5-dimethyl-4-hydroxyphenyl)sulfide, 2,2-bis(3,5-dimethyl-4-hydroxyphenyl)hexafluoropropane, 2,2-bis(3,5-dimethoxy-4-hydroxyphenyl)propane, bis(3,5-dimethoxy-4-hydroxyphenyl)methane, 2,2-bis(3-methoxy-4-hydroxy-5-methylphenyl)propane, bis(3-methoxy-4-hydroxy-5-methylphenyl)methane, 2,2-bis(3,5-diphenyl-4-hydroxyphenyl)propane, bis(3,5-diphenyl-4-hydroxyphenyl)methane, 2,2-bis(3,5-diphenoxy-4-hydroxyphenyl)propane, bis(3-phenoxy-4-hydroxy-5-methyl)methane, and the like.

These bisphenol compounds (III) and (IV) are employed in such an amount that the total amount is substantially equimolar with terephthaloyl chloride. As occasion demands, they can be employed in excess or less amount up to 10% by mole. The bisphenol compounds are employed as their bis-alkali metal salts, i.e. bisphenolates, in the form of an aqueous solution or solid.

Any solvents inert to the reaction can be employed as a reaction medium. Examples of the solvent are halogenated hydrocarbons such as methylene chloride, chloroform and o-dichlorobenzene, aromatic hydrocarbons such as toluene and xylene, organic solvents having polar groups inert to the reaction such as nitrobenzene, and the like. These solvents may be employed alone or in admixture thereof. In some organic solvents, the polyester polymer deposits in the course of the polymerization.

The phase transfer catalysts used in the present invention are quaternary ammonium salts, quaternary phosphonium salts, crown ethers, and the like. Examples of the quaternary ammonium salts are, for instance, trioctylmethylammonium chloride, benzyltributylammonium chloride, benzyltriethylammonium chloride, benzyltrimethylammonium chloride, cetyldimethylbenzylammonium chloride, octyltriethylammonium bromide, decyltriethylammonium bromide, lauryltriethylammonium bromide, cetyltriethylammonium bromide, N-laurylpyridinium chloride, N-laurylpyridinium bromide, N-heptylpyridinium bromide, and the like. Examples of the quaternary phosphonium salt are, for instance, tetrabutylphosphonium bromide, triethyloctadecylphosphonium bromide, tetraphenylphosphonium bromide, triphenylmethylphosphonium bromide, trioctylethylphosphonium bromide, cetyltriethylphosphonium bromide, and the like. As crown ethers, there can be all of those capable of forming a complex with an alkali metal ion so as to activate a phenolate ion to be paired, e.g. 18-crown-6, dibenzo-18-crown-6, dicyclohexyl-18-crown-6, dibenzo-24-crown-8, 12-crown-4, 15-crown-5, cyclohexyl-12-crown-4, tribenzo-18-crown-6, tetrabenzo-18-crown-6, dibenzo-26-crown-6, and the like. The amount of the catalyst is selected from 0.01 to 20% by mole, preferably 0.1 to 10% by mole, based on the total acid dichloride.

It has hitherto been known to employ a quaternary ammonium salt or a quaternary phosphonium salt as a catalyst in an interfacial condensation polymerization process. However, such a process has a drawback of causing undesirable emulsification of the system sometimes and therefore requiring a special manner in agitation. According to the process of the present invention, in case of employing the quaternary ammonium salts and the quaternary phosphonium salts as phase transfer catalysts, polymerization reaction proceeds only in an organic phase. In general, all of oil-soluble phase transfer catalysts are usable in the present invention. Preferably, the catalysts having no emulsifying function are employed, and in that case, emulsification of the system does not occur at all, and after a relatively short time from the completion of the polymerization, the aqueous phase can be immediately separated. In case of employing the crown ethers as phase transfer catalysts, they have, of course, no emulsifying function, thus causing no emulsification of the system, and it is also possible to carry out the reaction substantially only in an organic solvent when the bisphenolates are employed in solid form.

Further, as another embodiment of the phase transfer reaction, it is possible to add a dicarboxylic acid chloride and a bisphenolate to a reaction system at any time and stepwise with attention so that the final molar amounts thereof are equal to each other. On the basis of such a reaction manner, the present inventors have also found the following process. That is to say, alkali metal salts of at least one bisphenol compound (III) and at least one bisphenol compound (IV) are first reacted with a larger or less molar amount of terephthaloyl chloride than the alkali metal salts. Subsequently, in the final stage of the reaction, terephthaloyl chloride when it has been employed in a less amount or at least one alkali metal salt of the bisphenol compounds when the acid chloride has been employed in excess, is added to the raction mixture such that equimolar amounts of the alkali metal salts of bisphenol compounds and terephthaloyl chloride in total are finally reacted so as to complete the polymerization reaction. In that case, oligomers are produced within the period before reaching the final stage, and at the time when the total number of moles of the bisphenol compounds and the total number of moles of terephthaloyl chloride become finally equal, polyester polymers having a high degree of polymerization are obtained and the viscosity of the reaction system also increases with the formation of the polymers. In this manner, it is possible to prepare a polyester resin in which the recurring units are regularly chained in alternate or block arrangement. As shown in Examples described after, the polyester resin prepared in this manner has an excellent hot alkali resistance as compared with the polyester resin prepared by non-stepwise process.

Also, for the purpose of obtaining the polymers having a desired molecular weight in good reproducibility, monofunctional compounds such as phenol, thiol, amine and acid halide compounds may be employed in the present invention as agents for controlling the molecular weight.

The polymerization reaction is carried out usually at a temperature of 0° to 100° C. In general, the reaction time within the range of 2 to 5 hours is sufficient.

The produced polymer is recovered from the reaction mixture in a usual manner. For instance, there may be adopted a process by precipitation of the polymer with an organic solvent which is non-solvent to the polymer, a process in which the reaction mixture is poured into hot water, thereby solidifying the polymer while evaporating a solvent, and a process in which a film is directly obtained by casting the separated organic phase.

The present invention is more specifically explained and described by means of the following Examples. These Examples are intended to illustrate the invention and are not to be construed to limit the scope of the invention.

EXAMPLE 1

In 20 ml. of a 1.25 N aqueous solution of sodium hydroxide were dissolved 5 millimoles of 2,2-bis-(4-hydroxyphenyl)propane (hereinafter referred to as "bisphenol A") and 5 millimoles of bis(3,5-dimethyl-4-hydroxyphenyl)methane (hereinafter referred to as "TM bisphenol F"). To the aqueous solution was quickly added a solution of 10 millimoles of terephthaloyl chloride and 0.25 millimole of trioctylmethylammonium chloride as a phase transfer catalyst dissolved in 20 ml. of o-dichlorobenzene, and the reaction was carried out at room temperature for 3 hours with agitation. No emulsification of the reaction system was observed. After decanting the aqueous phase, the organic phase was washed twice with 50 ml. of water with vigorously stirring. The viscous organic phase was added to a large excess of methanol to precipitate a polymer. The yield of the polymer was 100%. The polymer was soluble in chloroform, and a film formed from the chloroform solution was transparent and strong. The polymer had a melting point of 290° to 300° C. and an intrinsic viscosity of 0.56 (at 32° C. in chloroform).

EXAMPLE 2

The procedure of Example 1 was repeated except that 7.5 millimoles of bisphenol A and 2.5 millimoles of TM bisphenol F were employed as bisphenol compounds.

The obtained polymer was soluble in chloroform, and had a melting point of 320° C. and a glass transition temperature of 280° C. A film formed from a solution of the polymer in 1,1,2-trichloroethane had a tensile strength of 750 kg./cm.$^2$, and the elongation at breaking was 6%. Infrared absorption spectrum of the film is shown in FIG. 1.

EXAMPLE 3

The procedure of Example 1 was repeated except that 2.5 millimoles of bis(4-hydroxyphenyl)sulfone (hereinafter referred to as "bisphenol S") and 7.5 millimoles of TM bisphenol F were employed as bisphenol compounds.

The obtained polymer was soluble in chloroform, and a film formed from the solution was strong. The polymer had a melting point of 280° to 295° C., a glass transition temperature of 184° C. and an intrinsic viscosity of 0.46 (32° C. in chloroform).

EXAMPLE 4

The procedure of Example 1 was repeated except that 2.5 millimoles of bisphenol A, 2.5 millimoles of bisphenol S and 5 millimoles of TM bisphenol F were employed as bisphenol compounds.

The obtained polymer had a melting point of 280° to 290° C.

EXAMPLE 5

The procedure of Example 1 was repeated except that a solution of 10 millimoles of bisphenol A and 5 millimoles of TM bisphenol F dissolved in 20 ml. of a 1.25 N aqueous solution of potassium hydroxide under a nitrogen atmosphere and 0.3 millimole of dibenzo-18-crown-6 as a phase transfer catalyst were employed.

The obtained polymer had a melting point of 300° to 310° C., a glass transition temperature of 256° C. and an intrinsic viscosity of 1.1 at (32° C. in chloroform).

EXAMPLE 6

In 10 ml. of a 1.25 N aqueous solution of potassium hydroxide was dissolved 5 millimoles of TM bisphenol F under a nitrogen atmosphere. To the aqueous solution was added a solution of 10 millimoles of terephthaloyl chloride and 0.25 millimole of dibenzo-18-crown-6 as a phase transfer catalyst dissolved in 20 ml. of o-dichlorobenzene. The mixture was vigorously stirred at room temperature for 30 minutes. The light red color of the aqueous phase disappeared and it showed that TM bisphenol F reacted, but the viscosity rise of the reaction system was small.

To the reaction mixture was then added a solution of 5 millimoles of bisphenol A dissolved in 10 ml. of a 1.25 N aqueous solution of potassium hydroxide, and the mixture was stirred. The viscosity of the organic phase suddenly rose. After 2 hours, no emulsification of the reaction system was observed. The aqueous phase was decanted, and the organic phase was washed 3 times with 50 ml. each of water. The viscous organic phase was added to acetone to precipitate a polymer. The yield of the polymer was 100%. The polymer had a melting point of 305° to 320° C., and was soluble in 1,1,2-trichloroethane. The trichloroethane solution of the polymer gave a strong film. The polymer had substantially the following recurring units.

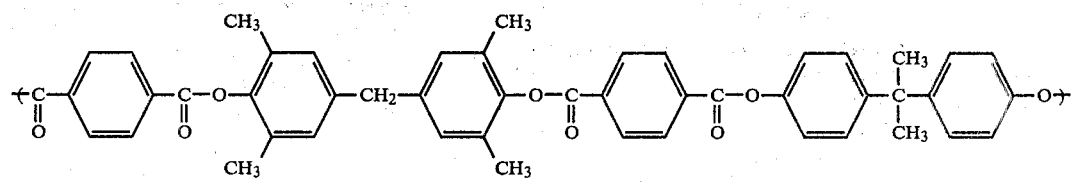

EXAMPLE 7

In 10 ml. of a 1 N aqueous solution of sodium hydroxide was dissolved 4 millimoles of TM bisphenol F. To the aqueous solution was added a solution of 8.1 millimoles of terephthaloyl chloride and 0.5 millimole of trioctylmethylammonium chloride dissolved in 15 ml. of chloroform, and the mixture was stirred for 30 minutes at room temperature. A solution of 8 millimoles of bisphenol A dissolved in 15 ml. of 1.3 N aqueous solution of sodium hydroxide was then added to the mixture. After further stirring the mixture for 30 minutes, a solution of 4 millimoles of terephthaloyl chloride dissolved in 10 ml. of chloroform was added to the mixture. At this stage, the numbers of moles of the bisphenol compounds and terephthaloyl chloride added became equal to each other. The viscosity of the organic phase largely increased by stirring of the mixture. After stirring for 2 hours, the aqueous phase was decanted, and the organic phase was washed twice with 50 ml. each of water with vigorously stirring. A viscous organic phase was added to an excess of methanol to precipitate a polymer.

The yield of the polymer was 100%. The polymer was soluble in chloroform, and had a melting point of 310° to 320° C. and an intrinsic viscosity of 0.32 (at 32° C. in chloroform). The polymer had substantially the following structure.

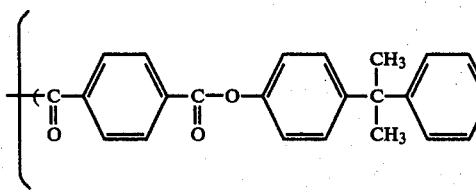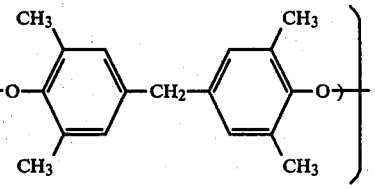

EXAMPLE 8

In 2,000 ml. of a 1.25 N aqueous solution of sodium hydroxide were dissolved 0.667 mole of bisphenol A and 0.333 mole of TM bisphenol F. Also, 1.01 moles of terephthaloyl chloride and 0.1 mole of trioctylmethylammonium chloride were dissolved in 2,000 ml. of methylene chloride. After cooling the both solutions to 10° C., the methylene chloride solution was added to the sodium hydroxide solution with vigorous stirring. After 2 hours, stirring was stopped. The reaction mixture immediately separated into a viscous organic layer and an aqueous layer. After neutralizing the aqueous layer with diluted hydrochloric acid, the organic layer was taken out and was washed twice with 2,000 ml. each of water. The organic layer was poured into large amounts of methanol and a polymer was isolated. The polymer had an intrinsic viscosity of 0.72 (at 32° C. in chloroform).

EXAMPLE 9

In 80 ml. of methylene chloride were dissolved 0.04 mole of terephthaloyl chloride and $4.0 \times 10^{-4}$ mole of trioctylmethylammonium chloride, and the solution was cooled to 2° C. and stirred vigorously. To the solution was added a solution of 0.02 mole of bisphenol A dissolved in 40 ml. of a 1.25 N aqueous solution of sodium hydroxide over 5 minutes, and subsequently a solution of 0.02 mole of TM bisphenol F dissolved in 40 ml. of a 1.25 N aqueous solution of sodium hydroxide over 5 minutes. The mixture was further stirred for 1.5 hours, and the aqueous phase was neutralized. The organic phase was washed twice with water and then added to methanol to isolate a polymer. The polymer had an intrinsic viscosity of 0.75 (at 32° C. in chloroform).

A film was formed by casting a 10% by weight 1,1,2-trichloroethane solution of the polymer. The tensile strength was 750 kg./cm.$^2$ and the elongation at breaking was 11%.

EXAMPLE 10

In 80 ml. of methylene chloride were dissolved 0.04 mole of terephthaloyl chloride and $4.0 \times 10^{-4}$ mole of trioctylmethylammonium chloride. After cooling the resulting solution to 1° C., to the solution were added with vigorous stirring a solution of 0.013 mole of TM bisphenol F dissolved in 27 ml. of a 1.25 N aqueous solution of sodium hydroxide over 3 minutes and 20 seconds and subsequently a solution of 0.027 mole of bisphenol A dissolved in 53 ml. of a 1.25 N aqueous solution of sodium hydroxide over 6 minutes and 40 seconds. After reacting for 1.5 hours with stirring, the produced polymer was recovered in the same manner as in Example 9. The polymer had an intrinsic viscosity of 0.75 (32° C., chloroform).

EXAMPLE 11

The procedure of Example 10 was repeated except that the order of the addition of TM bisphenol F and bisphenol A was changed. The produced polymer had an intrinsic viscosity of 0.78 (32° C., chloroform).

EXAMPLE 12

In 80 ml. of methylene chloride were dissolved 0.04 mole of terephthaloyl chloride and $4 \times 10^{-4}$ mole of trioctylmethylammonium chloride. The solution was cooled to 2° C. and stirred vigorously. To the solution were added a solution of 0.01 mole of TM bisphenol F dissolved in 20 ml. of a 1.25 N aqueous solution of sodium hydroxide over 2 minutes and 30 seconds and subsequently a solution of 0.03 mole of bisphenol A dissolved in 60 ml. of a 1.25 N aqueous solution of sodium hydroxide over 5 minutes and 30 seconds. After stirring for 1.5 hours, the produced polymer was recovered in the same manner as in Example 9. The intrinsic viscosity of the polymer was 0.46 (32° C., chloroform).

Figure 2:
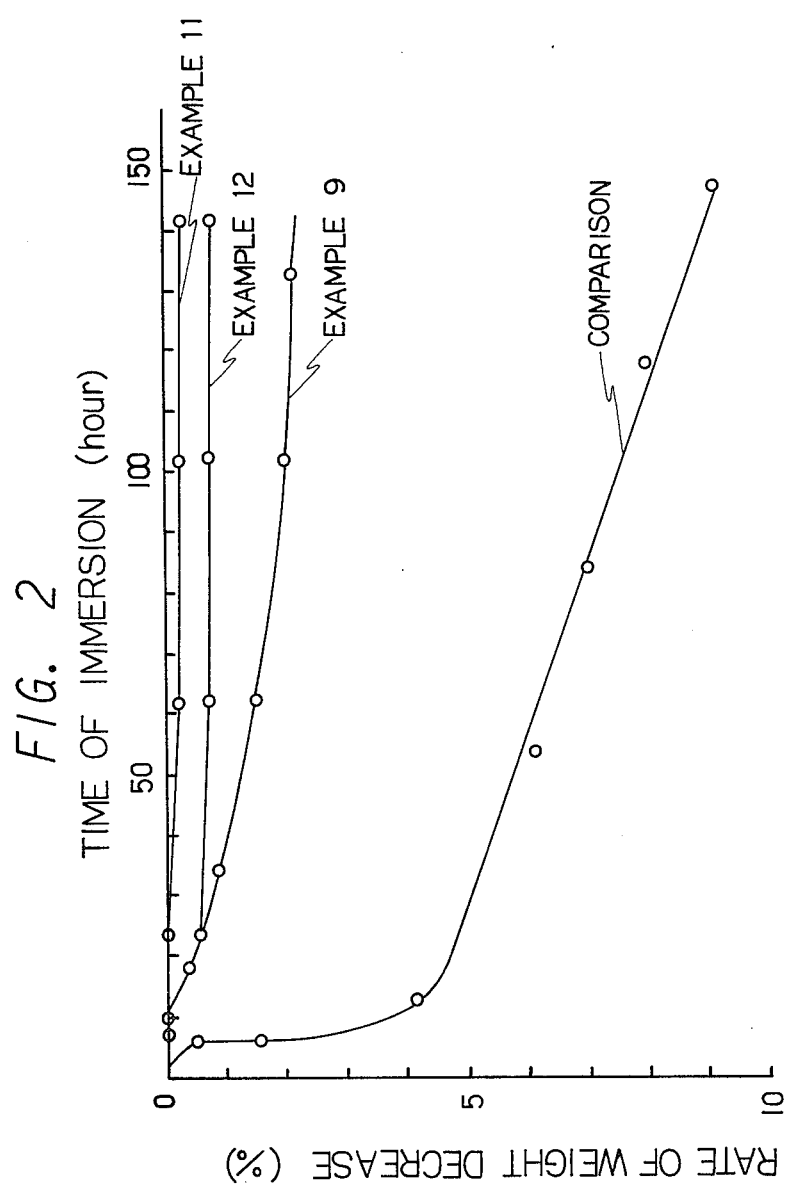
FIG. 2 is a graph showing the weight decrease of aromatic polyester resins by immersing in hot water.

A hot water resistance test of aromatic polyester resins was made as follows: Films were formed from 10% by weight 1,1,2-trichloroethane solutions of the polymers obtained in Examples 9, 11 and 12. The respective films were immersed in deionized water of 80° C. The rate of the weight decrease to the original weight of a film was obtained. The rates of the weight decrease were plotted against the time of immersion in FIG. 2 together with the results of the immersion test of a film prepared in the same manner from a conventional aromatic polyester resin consisting of terephthalic acid, isophthalic acid and bisphenol A (commercially available under the commercial name "U-100" made by UNITIKA Ltd.) (Comparison). It would be understood from FIG. 2 that the polyester resin of the present invention has an improved hot water resistance.

Figure 3:
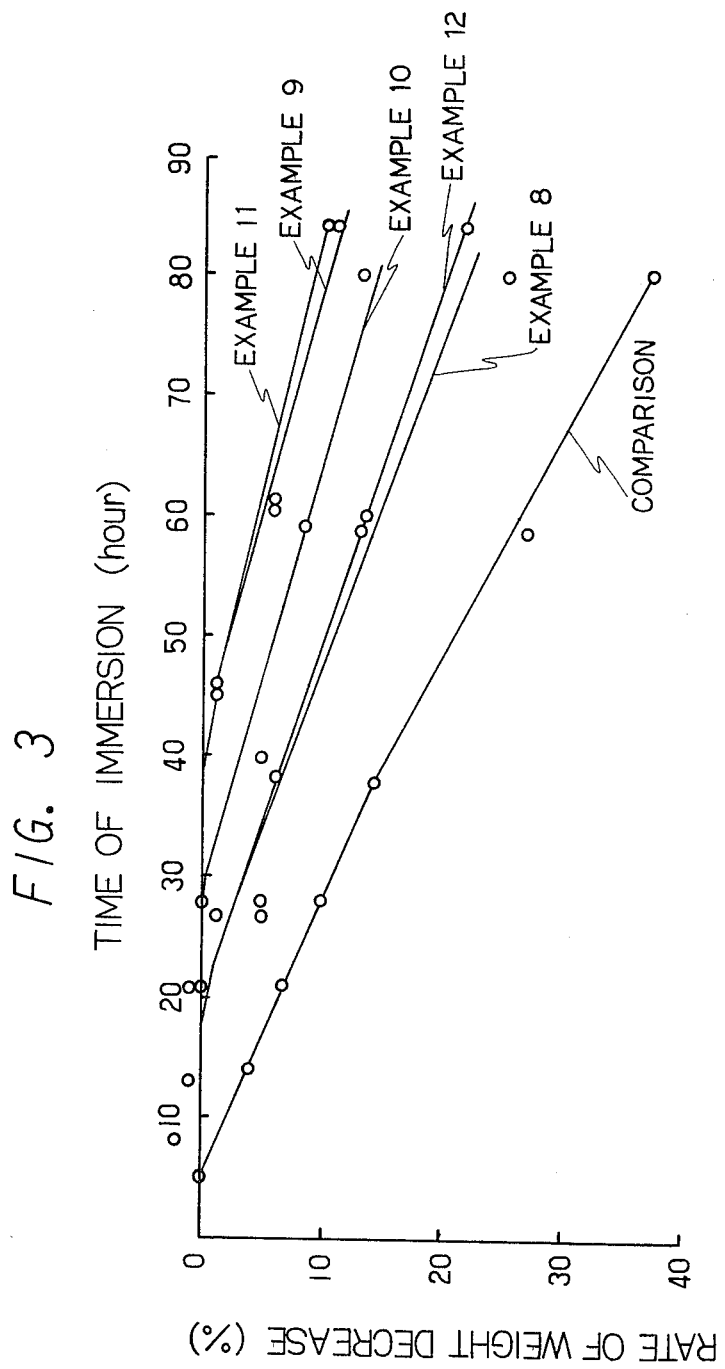
FIG. 3 is a graph showing the weight decrease of aromatic polyester resins by immersing in a hot aqueous solution of an alkali.

A hot alkali resistance test of aromatic polyester resins was made by employing the polymers obtained in Examples 8, 9, 10, 11 and 12 and the polyester resin U-100 (Comparison) in the same manner as the hot water resistance test except that films were immersed in a 10% by weight aqueous solution of sodium hydroxide at 70° C. The results are shown in FIG. 3, from which it would be understood that the hot alkali resistance of the polyester resins of the present invention is remarkably improved as compared with a conventional polyester resin.

What we claim is:

1. An aromatic polyester resin comprising (a) recurring units of the following formula (I):

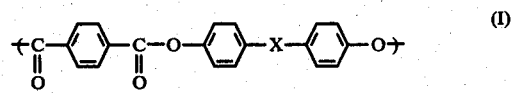

(I)

wherein X is a bivalent group selected from the group consisting of a bivalent hydrocarbon group having 1 to 10 carbon atoms, —O—, —S—, —SO₂— and —CO—, and (b) recurring units of the following formula (II):

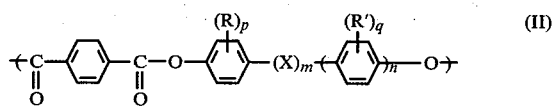
(II)

wherein X is as defined above, R and R' are a group selected from the group consisting of alkyl, aryl, aralkyl, alkoxyl, aryloxyl and phenylalkoxyl groups having 1 to 20 carbon atoms, and a mixture thereof, p+q=1 to 8, and m and n are 0 or 1, but n is not 0 when m is 1, provided that up to 10% by mole of the total of the units:

in the formulas (I) and (II) may be replaced with units:

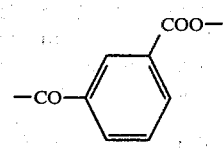

the ratio of (a)/[(a)+(b)] being from 0.05 to 0.95 by mole.

2. The polyester resin of claim 1, wherein the ratio of (a)/[(a)+(b)] is from 0.15 to 0.85 by mole.

3. The polyester resin of claim 1, wherein the component (b) consists of 99 to 1% by mole of the recurring units (II) in which the group R is a group other than a halogen atom and 1 to 99% by mole of the recurring units (II) in which the group R is a halogen atom.

4. The polyester resin of claim 1, wherein the component (b) consists of 50 to 99% by mole of the recurring units (II) in which the group R is a group other than a halogen atom and 50 to 1% by mole of the recurring units (II) in which the group R is a halogen atom.

5. The polyester resin of claim 1, wherein the recurring units (II) are those having the following formula:

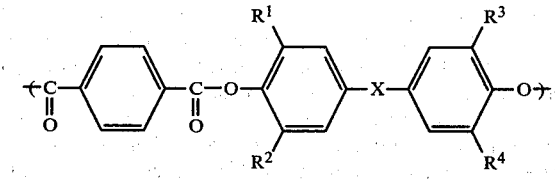

wherein X is as defined above, R¹, R², R³ and R⁴ are an alkyl group having 1 to 4 carbon atoms or an alkoxyl group having 1 to 4 carbon atoms.

6. The polyester resin of claim 1, wherein the intrinsic viscosity of the resin is from 0.1 to 5.0.

7. The polyester resin of claim 1, wherein the recurring units (a) and (b) are chained in a substantially regular arrangement.

8. A process for preparing an aromatic polyester resin which comprises reacting terephthaloyl chloride with an alkali metal salt of at least one member selected from bisphenol compounds of the following formula (III):

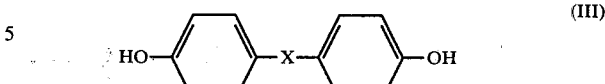
(III)

wherein X is a bivalent group selected from the group consisting of a bivalent hydrocarbon group having 1 to 10 carbon atoms, —O—, —S—, —SO₂— and —CO—, and an alkali metal salt of at least one member selected from bisphenol compounds of the following formula (IV):

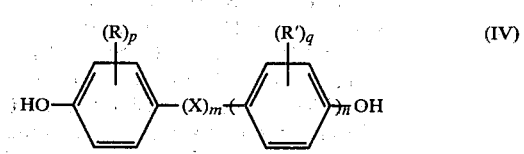
(IV)

wherein X is as defined above, R and R' are a group selected from the group consisting of alkyl, aryl, aralkyl, alkoxyl, aryloxyl and phenylalkoxyl groups having 1 to 20 carbon atoms, and a mixture thereof, p+q=1 to 8, and m and n are 0 or 1, but n is not 0 when m is 1, at a temperature of 0° to 100° C. in the presence of a phase transfer catalyst, wherein the ratio of the alkali metal salt of the bisphenol compound (III) to the alkali metal salt of bisphenol compound (IV) is 0.05/0.95 to 0.95/0.05 by mole.

9. The process of claim 8, wherein the bisphenol compounds (IV) are those having the following formula:

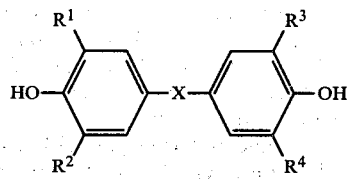

wherein X is as defined above, and R¹, R², R³ and R⁴ are an alkyl group having 1 to 4 carbon atoms, or an alkoxyl group having 1 to 4 carbon atoms.

10. The process of claim 8, wherein the alkali metals salts of at least one bisphenol compound (III) and at least one bisphenol compound (IV) are reacted with a less amount of terephthaloyl chloride than the total amount of said alkali metal salts, and terephthaloyl chloride is added to the resulting reaction mixture in such an amount that the total number of moles of terephthaloyl chloride is equal to the total number of moles of the alkali metal salts and is subsequently reacted.

11. The process of claim 8, wherein the alkali metal salts of at least one bisphenol compound (III) and at least one bisphenol compound (IV) are reacted with an excess amount of terephthaloyl chloride, and at least one alkali metal salt of the bisphenol compounds (III) and (IV) is added to the resulting reaction mixture in such an amount that the total number of moles of the alkali metal salts is equal to the number of moles of said terephthaloyl chloride and is subsequently reacted.

12. The process of claim 8, wherein the phase transfer catalyst is a member selected from the group consisting of quaternary ammonium salts, quaternary phosphonium salts and crown ethers.

* * * * *